US009218393B2

(12) United States Patent
Li

(10) Patent No.: US 9,218,393 B2
(45) Date of Patent: Dec. 22, 2015

(54) HIERARCHICAL DATA SERVER

(71) Applicant: Qifang Li, Elmhurst, NY (US)

(72) Inventor: Qifang Li, Elmhurst, NY (US)

(73) Assignee: Qifang Li, Elmhurst, NY (US)

( * ) Notice: Subject to any disclaimer, the term of this patent is extended or adjusted under 35 U.S.C. 154(b) by 353 days.

(21) Appl. No.: 13/862,546

(22) Filed: Apr. 15, 2013

(65) Prior Publication Data

US 2014/0310301 A1    Oct. 16, 2014

(51) Int. Cl.
*G06F 7/00* (2006.01)
*G06F 17/30* (2006.01)

(52) U.S. Cl.
CPC .............................. *G06F 17/30477* (2013.01)

(58) Field of Classification Search
None
See application file for complete search history.

(56) References Cited

U.S. PATENT DOCUMENTS

| 6,665,677 | B1 | 12/2003 | Wotring | |
|---|---|---|---|---|
| 6,701,516 | B1 | 3/2004 | Li | |
| 2001/0037345 | A1* | 11/2001 | Kiernan et al. | 707/513 |
| 2004/0205050 | A1* | 10/2004 | Stevens | G06F 17/30545 |
| 2007/0021995 | A1 | 1/2007 | Toklu et al. | |

OTHER PUBLICATIONS

XIRQL: A query language for information retrieval in XML document, Sep. 9, 2012.*

J. Jaakkola and P. Kilpeläinen, "Using sgrep for querying structured text files", Proceedings of SGML Finland 1996, Espoo, Finland, Oct. 4-5, 1996.
J. Le Maitre, E. Murisasco, M. Rolbert, "SgmIQL, a language for querying SGML documents", Proceedings of the 4th European Conference on Information Systems, Lisbon, Portugal, Jul. 2-4, 1996.
S. Abiteboul, D. Quass, J. McHugh, J. Widom, J.L. Wiener, "The Lorel query language for semistructured data", International Journal on Digital Libraries, vol. 1, No. 1, pp. 68-88 (1997).
K. Lee, Y.K. Lee, P.B. Berra, "Management of Multi-structured HypermediaDocuments: A Data Model, Query Language, and Indexing Scheme", Multimedia Tools and Applications, vol. 4, No. 2, pp. 199-223 (1997).
A. Duetsch, M. Fernandez, D. Florescu, A. Levy, D. Suciu, "XML-QL: A Query Language for XML", Submission to the World Wide Web Consortium, Aug. 19, 1998.
N. Fuhr and K. Grobjohann, "XIRQL: a query language for information retrieval in XML documents", SIGIR '01 Proceedings of the 24th annual international ACM SIGIR conference on Research and development in information retrieval.

* cited by examiner

*Primary Examiner* — Haroon H Hasan
*Assistant Examiner* — Thu Nga Nguyen

(57) ABSTRACT

A hierarchical data server provides a query and storage system for hierarchical data with three interfaces that are, data interface for accepting hierarchical data, query interface for accepting a query, and result interface for returning output of the query. The system models hierarchical data with one data object called data vine and one data structure type called data vine list. A data vine includes a name, a property list, and a child list. A data vine list is an ordered list of data vines. A data vine is recursively defined with its child list as a data vine list. The system introduces five basic operators, cast, restrict, unique, sort, and traverse. Each operator acts on one data vine list and returns another data vine list. A property list in a data vine is unordered with set operations implemented, which include default operation, update operation, elimination operation, replacement operation, and intersection operation.

20 Claims, 12 Drawing Sheets

```xml
<?xml version="1.0"?>
<catalog>
 <book cover="papercover">
  <title>FOL and PROLOG</title>
  <edition>2nd edition</edition>
  <author><last>Ryder</last><first>Mike</first></author>
  <publisher>AI Collections Inc.</publisher>
  <publishingDate>April 26, 2002</publishingDate>
  <price currency="USD">14.99</price>
  <price currency="CAD">22.95</price>
  <price currency="GBP">10.99</price>
 </book>
 <book year="" cover="papercover">
  <title>FOL and PROLOG</title>
  <edition>3rd edition</edition>
  <author><last>Ryder</last><first>Mike</first></author>
  <publisher>AI Collections Inc.</publisher>
  <publishingDate>May 10, 2004</publishingDate>
  <price currency="USD">12.99</price>
  <price currency="CAD">19.95</price>
  <price currency="GBP">10.99</price>
 </book>
 <book year="" cover="papercover">
  <title>Natural Language Processing with Prolog</title>
  <edition>4th edition</edition>
  <author><last>Anderson</last><first>Steve</first>
  </author>
  <author><last>North</last><first>Hudson</first></author>
  <author><last>Turner</last><first>Martha</first>
  </author>
  <publisher>AI Collections Inc.</publisher>
  <publishingDate>July 9, 2008</publishingDate>
  <price currency="USD">34.99</price>
  <price currency="CAD">37.99</price>
  <price currency="GBP">24.99</price>
 </book>
 <book year="" cover="papercover">
  <title>Manage Web Data with Prolog</title>
  <edition>4th edition</edition>
  <author><last>North</last><first>Hudson</first></author>
  <author><last>Anderson</last><first>Steve</first>
  </author>
  <publisher>AI Collections Inc.</publisher>
  <publishingDate>October 25, 2003</publishingDate>
  <price currency="USD">39.99</price>
  <price currency="CAD">59.99</price>
  <price currency="GBP">26.99</price>
 </book>
```

Fig. 2A XML data (Part A) used for queries in all examples

```xml
<book year="" cover="papercover">
  <title>Beginning Logic Programming on Web</title>
  <edition></edition>
  <author><last>Gloag</last><first>Steve</first></author>
  <publisher>QuickEasyOnLine Inc.</publisher>
  <publishingDate>February 27, 2007</publishingDate>
  <price currency="USD">39.99</price>
  <price currency="CAD">51.99</price>
  <price currency="GBP">25.99</price>
</book>
<book year="" cover="papercover">
  <title>PROLOG Quick Guide</title>
  <edition>2nd edition</edition>
  <author><last>Wise</last><first>Larry</first></author>
  <author><last>Grote</last><first>Jack</first></author>
  <publisher>AI Collections Inc.</publisher>
  <publishingDate>February 1, 2001</publishingDate>
  <price currency="USD">39.99</price>
  <price currency="CAD">59.99</price>
  <price currency="GBP">26.99</price>
</book>
<book year="" cover="papercover">
  <title>PROLOG and Mathematical Induction</title>
  <edition>2nd edition </edition>
  <author><last>Wise</last><first>Larry</first></author>
  <publisher>Knowledge 123 Publishing</publisher>
  <publishingDate>May 17, 2007</publishingDate>
  <price currency="USD">14.99</price>
  <price currency="CAD">20.99</price>
  <price currency="GBP"></price>
</book>
<book year="" cover="papercover">
  <title>Logic Study with Prolog</title>
  <edition>2nd edition</edition>
  <author><last>Ridge</last><first>Victor</first></author>
  <publisher>Knowledge 123 Publishing</publisher>
  <publishingDate>July 17, 2007</publishingDate>
  <price currency="USD">9.95</price>
  <price currency="CAD">14.95</price>
  <price currency="GBP"></price>
</book>
<book year="" cover="papercover">
  <title>Artificial Intelligence on Web</title>
  <edition>Second edition </edition>
  <author><last>Laughton</last><first>Herman</first>
  </author>
  <publisher>Knowledge 123 Publishing</publisher>
  <publishingDate>February 27, 2007</publishingDate>
  <price currency="USD">49.99</price>
  <price currency="CAD">64.99</price>
  <price currency="GBP"></price>
</book>
</catalog>
```

Fig. 2B      XML data (Part B) used for queries in all examples

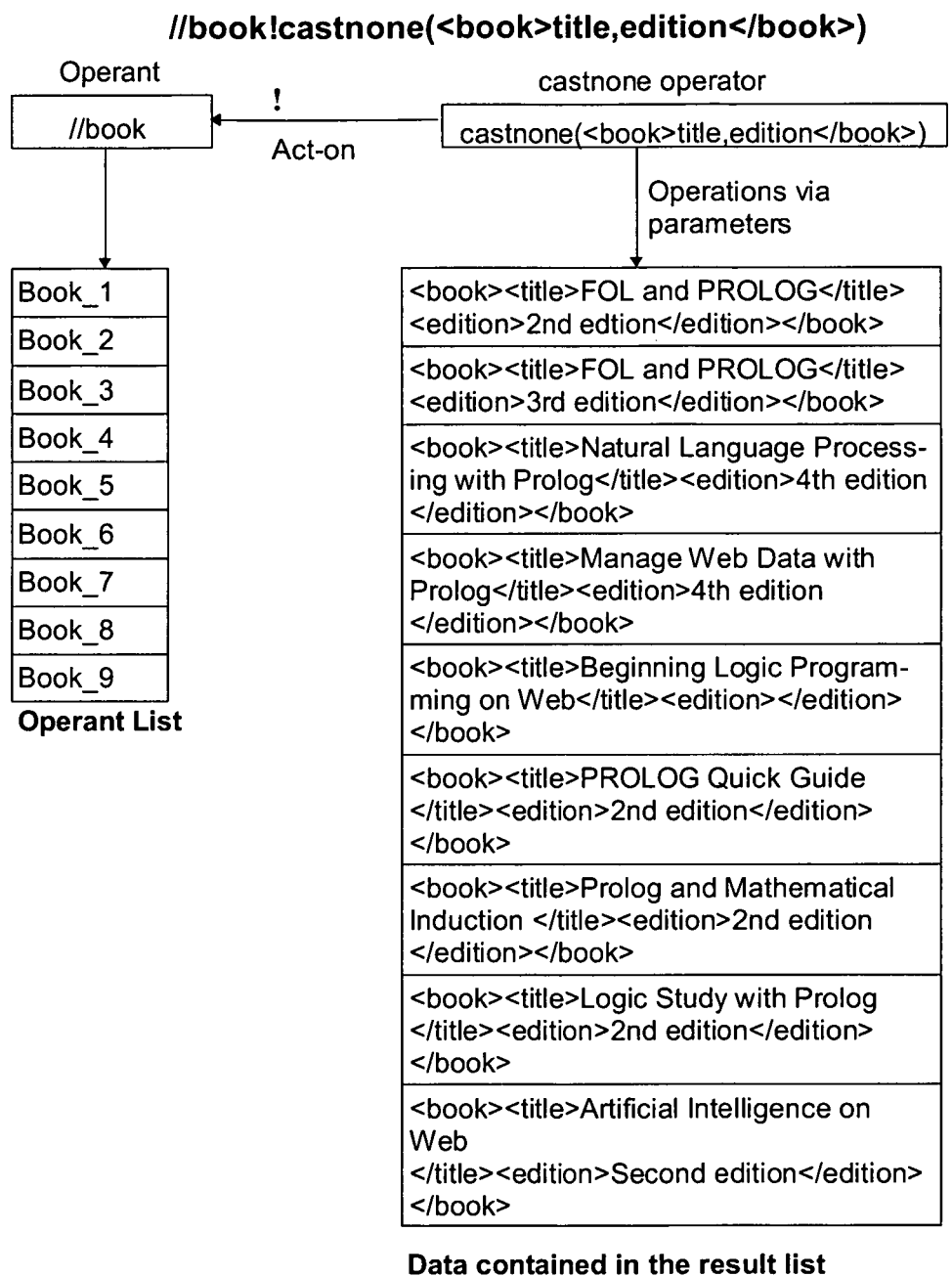
Fig. 3 A query to show the use of castNone opearator

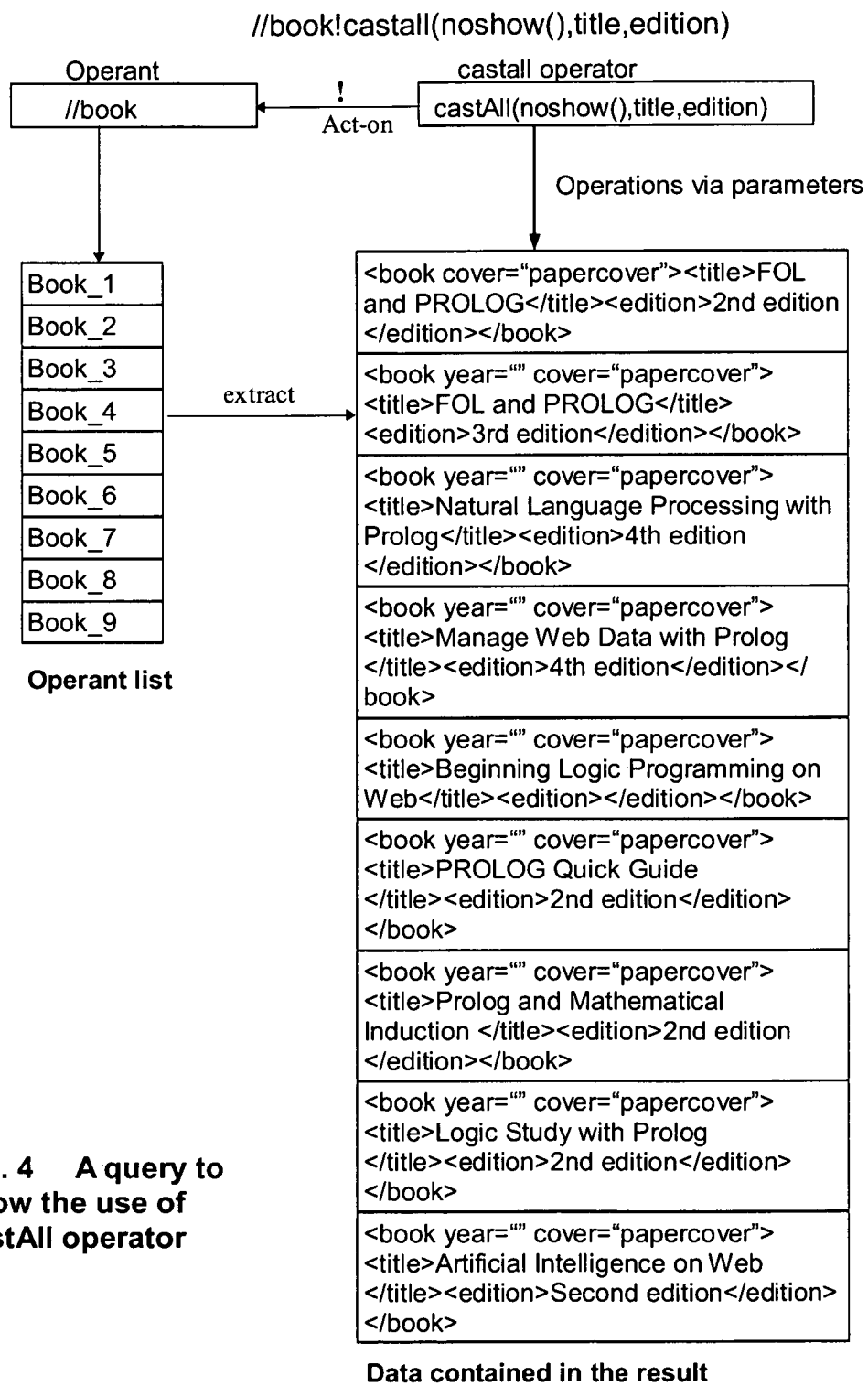
Fig. 4 A query to show the use of castAll operator

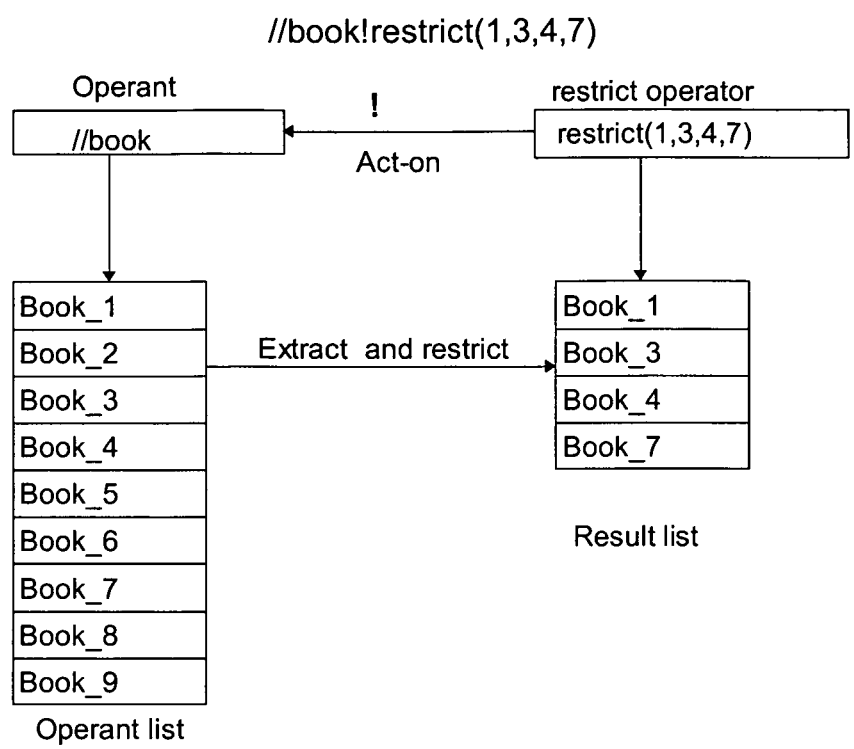
Fig. 5 A query to show the use of restrict operator

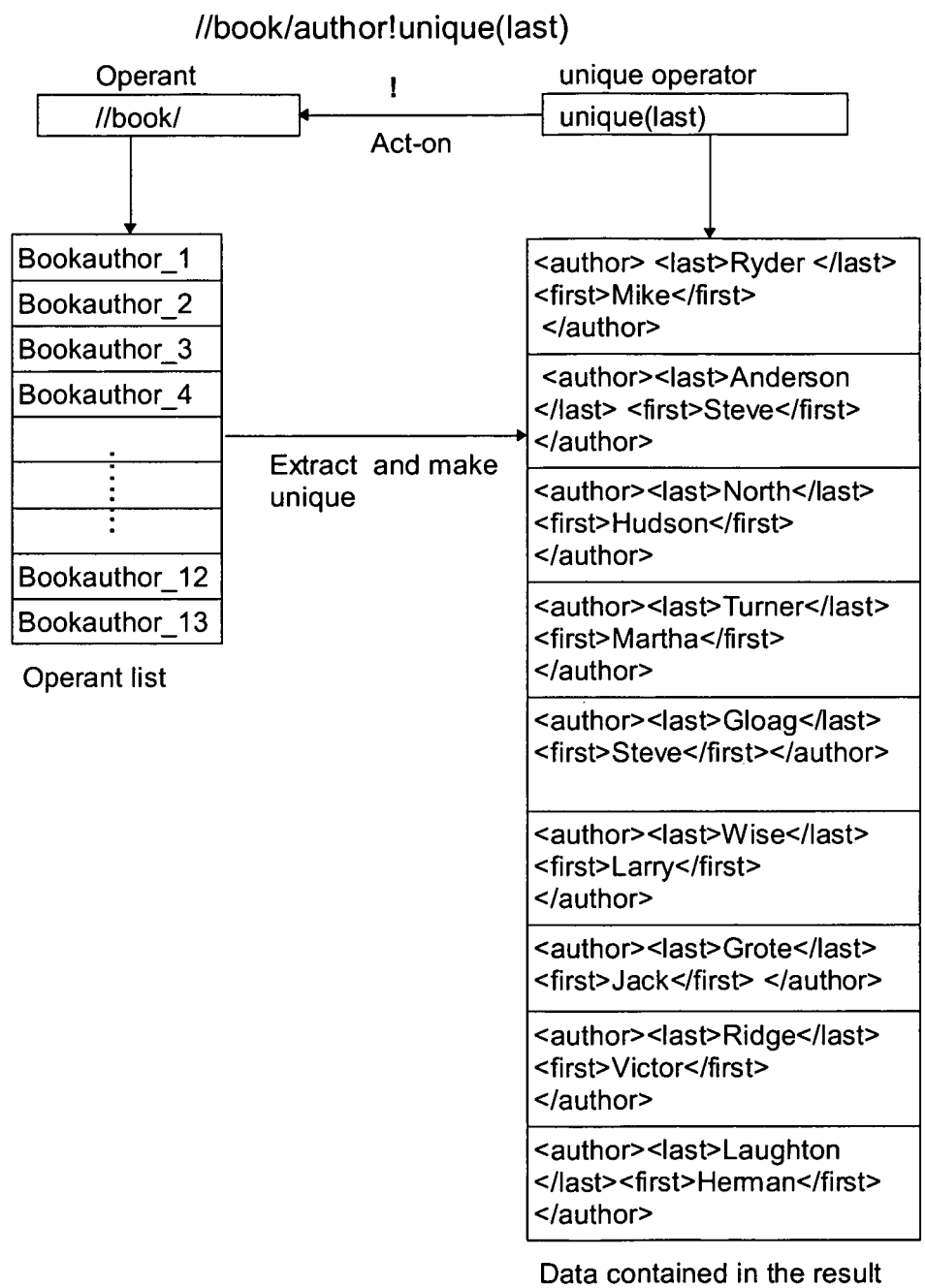
Fig. 6 A query to show the use of unique operator

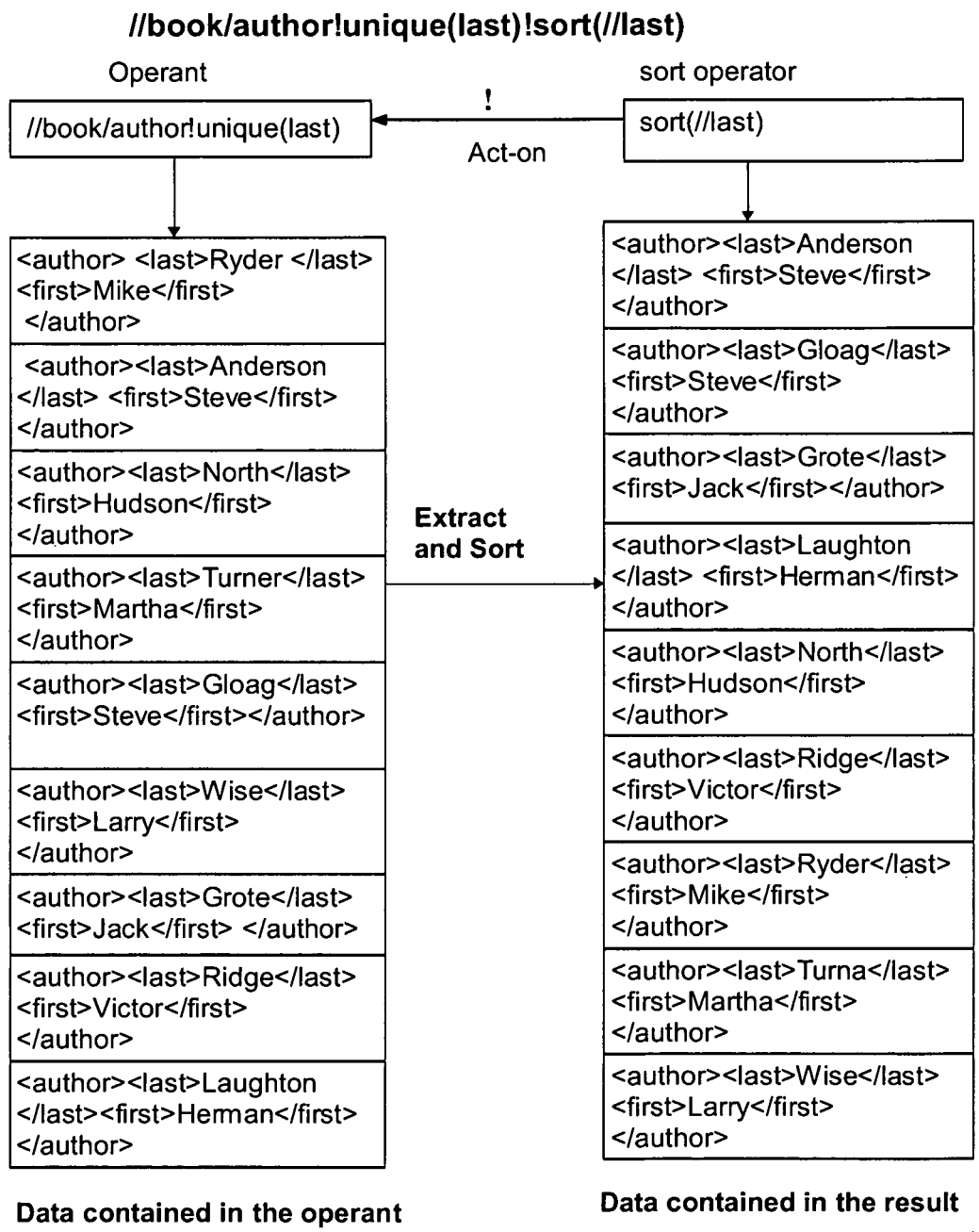
Fig. 7 A query to show the use of sort operator

A query to show the use of traverse operator

Query:
```
_Book:=//book,
<example10>
  _Book!unique(title)!
    castnone(
      standIn(_Pointer1),
      _X:=_Book!castall(title=_Pointer1/title)//price!castall(@currency="USD"),
      <minprice>
        min(_X),
        [("title",title),("lastname",//last)],
      </minprice>,
    )
</example10>
```

Query Result:
```
<example10>
  <minprice title="FOL and PROLOG" lastname="Ryder">
    12.99
  </minprice>
  <minprice title="Natural Language Processing with Prolog"
  lastname="Anderson">
    34.99
  </minprice>
  <minprice title="Manage Web Data with Prolog" lastname="North">
    39.99
  </minprice>
  <minprice title="Beginning Logic Programming on Web" lastname="Gloag">
    39.99
  </minprice>
  <minprice title="PROLOG Quick Guide" lastname="Wise">
    39.99
  </minprice>
  <minprice title="PROLOG and Mathematical Induction" lastname="Wise">
    14.99
  </minprice>
  <minprice title="Logic Study with Prolog" lastname="Ridge">
    9.95
  </minprice>
  <minprice title="Logic Study with Prolog" lastname="Ridge">
    49.99
  </minprice>
</example10>
```

Fig. 9   A query to show the use of aggregate function min()

Query:
```
<bib>
  //book!castNone(count(author) isGT 1,
                  title,
                  author!restrict(1,2),
                  if count(author) isGT 2 then <etcetra/>)
</bib>
```

Query Result :
```
<bib>
  <title> Natural Language Processing with Prolog</title>
  <author>
      <last>Anderson</last>
      <first>Steve</first>
  </author>
  <author>
      <last>North</last>
      <first>Hudson</first>
  </author>
  <etcetra />
  <title>Manage Web Data with Prolog</title>
  <author>
      <last>North</last>
      <first>Hudson</first>
  </author>
  <author>
      <last>Anderson</last>
      <first>Steve</first>
  </author>
  <title>PROLOG Quick Guide</title>
  <author>
      <last>Wise</last>
      <first>Larry</first>
  </author>
  <author>
      <last>Grote</last>
      <first>Jack</first>
  </author>
</bib>
```

Fig. 10  A query to show the use of isGT and If-then

Query:

```
_Book := //book,
<example>
    _X:=_Book//price!castAll(@currency="USD"),
    <averageprice>
    "The total amount is $",sum(_X),". The average price of ",
    count(_X), " books is $", avg(_X), ".",
    </averageprice>
</example>
```

Query Result:

```
<example>
    <averageprice>
        The total amount is $257.87. The average price of 9 books is
$28.65222222.
    </averageprice>
</example>
```

Fig. 11
A query to show the use of functions count(), sum(), and avg()

HIERARCHICAL DATA SERVER

BACKGROUND OF THE INVENTION

1. Field of the Invention

This invention relates to a query system for searching database based upon SGML. The invention is a query system designed for working on hierarchical structures. It provides queries with operators and operations to retrieve and modify any element in a hierarchical structure. To construct a result, the query language in the invention binds on one hierarchical data source or multiple hierarchical data sources for adopting some child structures, getting prototype of a desired part, and cascading with property data inside.

2. Description of the Related Art

Many hierarchical data formats became the standards of technologies including SGML (Standard Generalized Markup Language), HTML (Hyper Text Markup Language), and XML (Extensible Markup Language). Among them, SGML is the most basic one. The rest are its derivatives. The HTML 4 is considered to be an application of SGML, and XML is considered to be a subset of SGML. Many query languages have been disclosed for the purpose of extracting and modifying SGML data. These published data query systems or prior arts adopt SQL-like languages. Some of them use FLWOR expressions (FOR, LET, WHERE, ORDERED BY, RETURN), and others use constructs like SELECT-WHERE similar to SQL. However, SQL is dealing with relational databases that are not hierarchically structured, and actually, are of one single level structured. This innate scope makes SQL-Like query languages less constructible than a query language that is directly defined on hierarchal structures of multiple levels. The invention is directly defined on and designed on hierarchical structures. It is a complement to the approach in all of the related arts. The major techniques in the query language of the invention are the use of CRUST operators that are cast operator, restrict operator, unique operator, sort operator, and traverse operator.

U.S. Patent Application Publication No. 2007/0219959 A1 by Kanemasa and published on Sep. 20, 2007, describes a query language for XML (named "XML-QL"), which has a SELECT-WHERE construct, similar to SQL, and borrows features of various query languages for semi-constructed data. Kanemasa does not suggest use of the CRUST operators on hierarchical structures or set operations on property lists to retrieve and construct SGML data according to the claimed invention.

U.S. Pat. No. 6,665,677 B1 issued to Wotring on Dec. 13, 2003, allows data to be transformed from a relational database to a hierarchical database. Wotring does not suggest use of the CRUST operators on hierarchical structures or set operations on property lists to retrieve and construct SGML data according to the claimed invention.

J. Jaakkola and P. Kilpeläinen, "Using sgrep for querying structured text files", *Proceedings of SGML Finland* 1996, Espoo, Finland, Oct. 4-5, 1996, implement an algebra of unrestricted text fragments called regions. The algebra allows the retrieval of document components, represented as regions, based on conditions on their relative containment and ordering. J. Jaakkola and P. Kilpeläinen do not suggest use of the CRUST operators on hierarchical structures or set operations on property lists to retrieve and construct SGML data.

J. Le Maitre, E. Murisasco, M. Rolbert, "SgmlQL, a language for querying SGML documents", *Proceedings of the 4th European Conference on Information Systems*, Lisbon, Portugal, Jul. 2-4, 1996, present a complete SGML query language based on SQL-like expressions. The language uses pattern-matching primitives, which are integrated into common operators, such as SELECT/FROM/WHERE. J. Le Maitre, E. Murisasco, and M. Rolbert do not suggest use of the CRUST operators on hierarchical structures or set operations on property lists to retrieve and construct SGML data.

S. Abiteboul, D. Quass, J. McHugh, J. Widom, J. L. Wiener, "The Lorel query language for semistructured data", International Journal on Digital Libraries, Volume 1, Number 1, 68-88 (1997) present a query language (called the Lorel language") for querying semi-structured data. Lorel language is written in the SQL/OQL style for querying data. For wide applicability, the simple object model underlying Lorel can be viewed as an extension of the ODMG data model and the Lorel language as an extension of OQL. Abiteboul et al. do not suggest use of the CRUST operators on hierarchical structures or set operations on property lists to retrieve and construct SGML data.

K. Lee, Y. K. Lee, P. B. Berra, "Management of Multi-structured HypermediaDocuments: A Data Model, Query Language, and Indexing Scheme", *Multimedia Tools and Applications*, Volume 4, Number 2, 199-223 (1997), propose an object-oriented model for multi-structured hypermedia documents by using unique element identifiers and an indexing schema. K. Lee, Y. K. Lee, P. B. Berra, do not suggest use of the CRUST operators on hierarchical structures or set operations on property lists to retrieve and construct SGML data.

A. Duetsch, M. Fernandez, D. Florescu, A. Levy, D. Suciu, "XML-QL: A Query Language for XML", *Submission to the World Wide Web Consortium* 19 Aug. 1998, introduce the XML, which is SQL-like and adopts FLWOR expressions (FOR, LET, WHERE, ORDERED BY, RETURN). A. Duetsch, M. Fernandez, D. Florescu, A. Levy, D. Suciu, do not suggest use of the CRUST operators on hierarchical structures or set operations on property lists to retrieve and construct SGML data.

N. Fuhr and K. Grobjohann, "XIRQL: a query language for information retrieval in XML documents", SIGIR '01 Proceedings of the 24th annual international ACM SIGIR conference on Research and development in information retrieval, add the features of weighting and ranking to XML and provide related query optimization. N. Fuhr and K. Grobjohann do not suggest use of the CRUST operators on hierarchical structures or set operations on property lists to retrieve and construct SGML data.

SUMMARY OF THE INVENTION

According to an aspect of the present disclosure, a dedicated storage system is provided with a query language. The storage system stores hierarchical databases particularly for data based upon SGML. The query language is for searching and modifying persistent data in the storage. The query language of the invention suggests a logic view on hierarchical data with a data object, called data vine; together with a data structure type, called data vine list that is an ordered list of data vines. Data vine and data vine list are recursively defined in an alternating way that the child list in a data vine is a data vine list and each member of a data vine list is a data vine. This mechanism helps to reach any element on hierarchical data up to certain high order and volume that a system can accommodate. The invention facilitates drilling on hierarchical data sources to extract and/or construct hierarchical data by working on data vine lists with the CRUST operators (Cast operator, Restrict operator, Unique operator, Sort operator, Travers operator).

A data vine is stored in the server in Prolog codes specifically defined in the format of a predicate name with four parameters. The first parameter is a reference to the parent element, the second parameter is a tag name or text in SGML, the third parameter is a list of properties, and the fourth parameter is a reference to the child list.

A query can be used to build knowledge leads for quick accesses to hierarchical data. A knowledge lead is a hierarchical structure building on the original hierarchical data. Queries can be based upon the original data source as well as the build-up knowledge leads. Well-designed knowledge leads by users could form a part of intelligence on the original hierarchical data source and make an application more useful.

The invention supports the current standards and technologies based upon SGML. By its hierarchical nature it could be adjusted with very few modifications and fully complied with new releases of the standards in the future. The invention provides an easy access and persistent storage for hierarchical data. The user interface of the invention is a simple query language. By submitting a query the stored data can be retrieved, updated, and modified in anyway. With a password or a few lines of verification in queries the data security can be improved. Although the query language does not have the same power as a subscripting language, however, it could enhance the management and utilization of subscripting languages by applying modularization on the subscripting source codes and processing the modularized as hierarchical data. All these features are available because the invention adopts a different way to the process: holding the whole data in hierarchical structures and casting out what are needed. It is a complement to the current approach of document-subscripting model.

The invention is a stand-alone software program, which stores, retrieves, modifies, and updates hierarchical data in SGML format. The usage of the invention covers all SGML derivatives.

A hierarchical data server includes five parts:

part 1, a data server, which resides in a computer, holds hierarchical data, and facilitates query services;

part 2, a data input interface, which provides a channel to an authorized user to store data in the server;

part 3, a query interface, which gives users an access to submit queries;

part 4, a result interface, which returns results to query submitter; and part 5, a self-contained query language for writing a query.

The invention works in a query model. Its administrator stores a computer readable data package in the server that resides in a computer. The data package gets into the server through the data input interface. The data package could be an SGML document, or a part of such document in well-formed format, or multiple SGML documents, or a combination of these mentioned.

To utilize the data in the package, a user or a computer program submits a query in the query language in part 5. The submitting can be done through LAN, WAN, or Internet to the server via part 3. Once the server receives the query a corresponding result is returned to the submitter via part 4. A query is a hierarchical structure written in the query language, which is actually the prototype of the query result. Depending on what a query is asking for, the result of the query could be an SGML document or a part of SGML document. The server in part 1 may return an empty string if no suitable result is found or an error is contained in the query.

The query language of part 5 is used to process stored data in SGML format. It is a declarative language.

The query language defines four data types:

number, which is an integer or a decimal number;

qualified name, which is a string starting with a lower case letter from a to z, followed by letters of: a to z, A to Z, the underscore "_", digits from 0 to 9;

double quote, which is a string and enclosed with double quote signs; and single quote, which is a string and enclosed with single quote signs.

The query language defines a property as a pair of property name, which is a qualified name, and property value, which is a double quote. The query language defines a property list as a group of properties.

For writing a query in a logic way, the query language suggests a data object called data vine that includes a name of qualified name, a property list; and a data structure called data vine list. Both data vine and data vine list are logic views to use with CRUST operators in order to formulate a query.

Angle tags in SGML are allowed in the query language to form hierarchical structures. An angle element in SGML represents a data vine in the query language. A tag name in SGML represents a data vine list in the query language. The traditional child operator of one slash sign, descendent operator of two slash signs, and property value operator of one commercial "at" sign are accepted by the query language of the invention. A child operator returns a data vine list of one level down on the path, in which each member has the same parent name that is the one before the operator sign"/", and the same child name that is the one after the operator sign "/". A descendent operator returns a data vine list of multiple levels down on the path, in which each member has the same parent name that is the one before the operator sign"//", and the same child name that is the one after the operator sign "//". A property value operator returns the property value belonging to the property name that is the one after the operator sign "@".

The query language in the invention provides five right unary operators that are the cast operator, the restrict operator, the unique operator, the sort operator, and the traverse operator. An operator acts on a data vine list and return another data vine list. In a query each operator is prefix with one exclamation point and postfix with parameters in parentheses.

The cast operator has two modes. The first mode is castall and the second mode is castnone. Both modes of cast operator open the navigating data vine and act with iterations on the members inside. The operator castAll extracts all members inside and includes all of them in the result list. The castNone operator only iterates all members inside without including anyone of them in the result list, instead, providing a change for alteration. A cast operator has parameters that can add more members into the result or remove any existing member from the result.

A restrict operator acts on a data vine list and only extracts those restricted members inside. A parameter could be one of the following where N, X, and Y are positive integers:

N, which allows only the Nth index of member in the result list;

between X and Y, which allows all members of index numbers greater than X and less than Y in the result;

first N, which allows all members from index 1 to index N in the result;

last N, which allows all members of the last N index numbers in the result;

even, which allows all members of even index numbers in the result; and odd, which allows all members of odd index numbers in the result.

A unique operator acts on a data vine list and extracts one for each satisfaction with the given condition of uniqueness. In case that duplicated ones are found, only the first one is selected. A unique operator has only one parameter that is a descendent name, and no path operator "/" is needed in the parameter.

A sort operator sorts the data vine list according to the given sorting conditions. Parameters of a sort operator could be one the following. The first parameter sortFlag is a sorting flag. Its value can be 1 for sensitive ascending, 2 for sensitive descending, 3 for insensitive ascending, and 4 for insensitive descending. The flag could be omitted and the default value is 1 of sensitive ascending. The second parameter can be one of tagName, /tagName, //tagName, tagName@attributeName, /tagName@attributeName, MagName@attributeName, and @attributeName.

A traverse operator acts on a data vine list, yields a spanning tree. The result collects those on the backward traverse path on the tree according to the given condition in parameters. A traverse operator and its parameter could be one of the following. In the notation here, tagName1 and tagName2 represent tag names; value1 and aValue2 represent values.

!traverse (from tagName1 aValue1 to tagName2 aValue2);
!traverse (from tagName1 aValue1); and
!traverse (to tagName2 aValue2).

The query language in the invention provides five property operations: default, +, −, *, and ^ among property lists. If S is the property list of the current data vine, P is a property list as [propert1, propert2 . . . propertyN], where each property is a pair of property name and property value, and N is a positive integer, the following operations are between S and P. S is not showing in the expression because S represents the current existing property list of the action.

P is the default operation on S. P completely replaces S and becomes the property list of the current data vine.

+P is the update operation on S. A property in P will replace a property in S if these two properties share the same name, otherwise this property will join S and become a new property of S.

−P is the elimination operation on S. A property in S will be removed if it has the same name and the same value with a property in P.

*P is the replacement operation on S. A property in P will replace a property in S if these two properties share the same name otherwise no action is taken.

^P is the intersection operation on S. Any property in S must be exactly the same as some property in P otherwise it will be dropped from the result.

The query language in the invention provides aggregation functions on a data vine list:

If _DVL is a data vine list and each member in _DVL has a number as value, the aggregation functions on _DVL are defined below.

Sum function is defined as sum(_DVL), which is the summation number of all data vine values from _DVL.

Count function is defined as count(_DVL), which is the count number of all data vines in _DVL.

Average function is defined as avg(_DVL), which is the average number of all data vine values from _DVL.

Minimum function is defined as min(_DVL), which is the minimum number of all data vine values from _DVL.

Maximum function is defined as max(_DVL), which is the maximum number of all data vine values from _DVL.

The query language in the invention provides criterion functions. In the following criterion functions, AA is a data vine list and BB is either a number or a double quote. A criterion function returns a value of logic true or false. In case BB is a data vine list, the first member of BB is used.

The equal function is expressed as the equal sign "=". The expression "AA=BB" will be evaluated to true if each member in AA has the same value as BB.

The greater-than function is expressed as the word "isGT". The expression "AA isGT BB" will be evaluated to true if each member in AA has the value greater than BB.

The greater-than-or-equal-to function is expressed as the word "isGTE". The expression "AA isGTE BB" will be evaluated to true if each member in AA has the value greater than or equal to BB.

The less-than function is expressed as the word "isLT". The expression "AA isLT BB" will be evaluated to true if each member in AA has the value less than BB.

The less-than-or-equal-to function is expressed as the word "isLTE". The expression "AA isLTE BB" will be evaluated to true if each member in AA has the value less than or equal to BB.

The query language in the invention provides conditional statements if-then and if-then-else that accommodate data vine lists.

All legal statements are:
a data vine list represented by a tag name, a path, or a data vine name;
a path operation of the child operator of one slash and the descendent operator of two slashes;
an operation of the Cast, Restrict, Unique, Sort, and Traverse operators;
a property operation;
a beginning angle tag and its closing angle tag conforming well-formed rules;
a single angle tag;
an assignment operation;
an assigned variable;
a function;
a built-in statement; and
a conditional statement.

All delimiters of SGML including starting tags, ending tags, single tags, tag names, and attribute names are legal terms in the query language and can be used in a query directly as native terms without any other signs. A tag element in SGML is assigned to a logic view of a data vine. A tag name in SGML is assigned to a logic view of a data vine list. The attribute name and value are assigned to logic views of property name and value respectively.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 2A illustrates XML data (Part A) used for queries in examples.

FIG. 2B illustrates XML data (Part B) used for queries in examples.

FIG. 3 illustrates a query to show the use of a castNone operator.

FIG. 4 illustrates a query to show the use of a castAll operator.

FIG. 5 illustrates a query to show the use of a restrict operator.

FIG. 6 illustrates a query to show the use of a unique operator.

FIG. 7 illustrates a query to show the use of a sort operator.

FIG. 9 illustrates a query to show the use of aggregate function min( )

FIG. 10 illustrates a query to show the use of isGT and If-then.

FIG. 11 illustrates a query to show the use of functions count( ) sum( ), and avg( ).

DESCRIPTION OF THE EMBODIMENTS

Various exemplary embodiments, features, and aspects of the disclosure will be described in detail below with reference to the drawings.

The invention provides a dedicated server program that facilitates persistent storage. A database administrator loads hierarchical data into server. A user submits a query based on the loaded hierarchical data. A query accepts SGML angle notations. Any data in a SGML angle are used directly without quote symbol. Any text between a pair of angle tags of SGML is used in the query language within a pair of double quote symbols. A query result returns a document in SGML or a section of well-formed SGML data. A frequently submitted query may be reused to build a knowledge lead that is a new hierarchical structure on the original hierarchical data. Subsequent queries can take this advantage and navigate on the knowledge lead to get a short cut to the desired data.

The invention works in a query model. In this model databases are input via computer readable medium to a server that is a program running in computer, a query is submitted to the server via computer readable medium for data request, and an answer is returned to the query maker via computer readable medium. The advantage of this model is that, data, files, and file locations are not exposed to query makers. The invention follows this model and extends it in the way that a query is returned either in whole if it succeeds everywhere or nothing if it fails somewhere. The invention provides a self-contained query language in which logic programming principles bind on statements of a query. If a query succeeds on each statement then the appropriated result is returned. No incomplete answer is returned and no rollback is needed.

Figure 1:
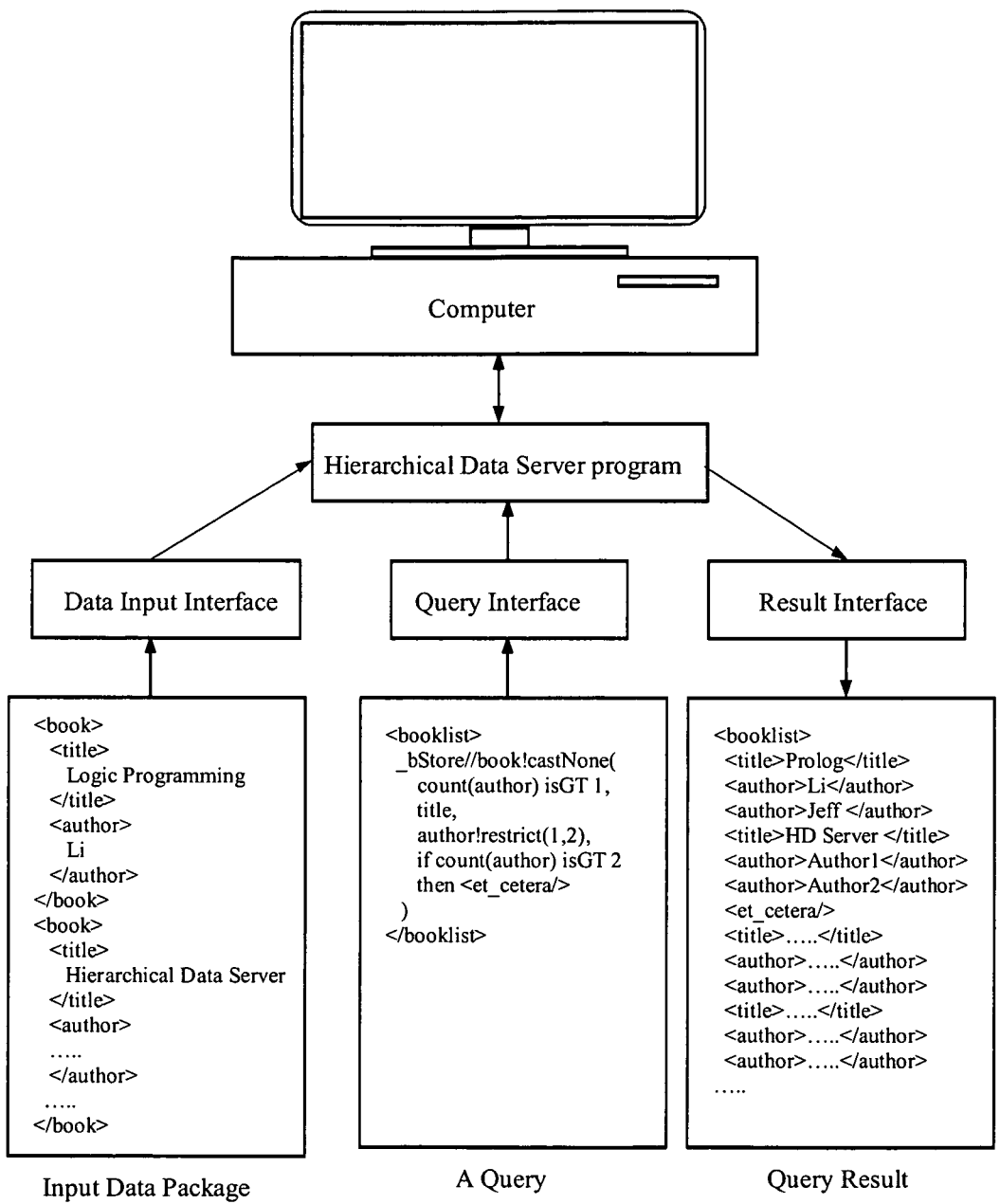
FIG. 1 illustrates a flow diagram of a hierarchical data server according to the exemplary embodiment of the present disclosure.

The invention includes five parts. First four parts are shown in FIG. 1. The part 5 is the query language.

part 1, a data server, which resides in a computer, holds hierarchical data, and facilitates query services;

part 2, a data input interface, which provides a channel to a server administrator or an authorized user to store data in the server;

part 3, a query interface, which gives users an access to submit a query;

part 4, a query interface, which returns result to query maker; and part 5, a self-contained query language for writing a query.

The following contents are SGML data of three books under catalog in SGML. The contents are input to the server via part 2 of the data input interface. The contents are processed and stored in the data server for subsequent queries.

```
<catalog>
  <book cover="papercover">
    <title>FOL and PROLOG</title>
    <edition>2nd edition</edition>
    <author><last>Ryder</last><first>Mike</first></author>
    <publisher>Al Collections Inc.</publisher>
    <publishingDate>April 26, 2002</publishingDate>
    <price currency="USD">14.99</price>
    <price currency="CAD">22.95</price>
    <price currency="GBP">10.99</price>
  </book>
  <book year=""cover="papercover">
    <title>Natural Language Processing with Prolog</title>
    <edition>4th edition</edition>
    <author><last>Anderson</last><first>Steve</first></author>
    <author><last>North</last><first>Hudson</first></author>
    <author><last>Turner</last><first>Martha</first></author>
    <publisher>Al Collections Inc.</publisher>
    <publishingDate>July 9, 2008</publishingDate>
    <price currency="USD">34.99</price>
    <price currency="CAD">37.99</price>
    <price currency="GBP">24.99</price>
  </book>
  <book year=""cover="papercover">
    <title>Manage Web Data with Prolog</title>
    <edition>4th edition</edition>
    <author><last>North</last><first>Hudson</first></author>
    <author><last>Anderson</last><first>Steve</first></author>
    <publisher>Al Collections Inc.</publisher>
    <publishingDate>October 25, 2003</publishingDate>
    <price currency="USD">39.99</price>
    <price currency="CAD">59.99</price>
    <price currency="GBP">26.99</price>
  </book>
</catalog>
```

A data vine is stored in the server in Prolog codes specifically defined in the format of a predicate name with four parameters. The first parameter is a reference to the parent data vine, the second parameter is a double quote corresponding to a tag name in SGML data, the third parameter is a list of properties, and the fourth parameter is a reference to the child list. A terminal data vine is a data vine with "none" as child reference. A tag value in SGML is expressed as a terminal data vine with the value in the second parameter. The above data of three books under catalog are stored with the following Prolog codes in server.

Among the codes, for example, t39513293834 (j48310636322,'book',[('cover',"papercover")], h24636326765) is a data vine stored in the server. The first parameter j48310636322 is the reference to the parent data vine, the second parameter 'book' is the tag name in the SGML data source, the third parameter [('cover',"papercover")] is a property list, and the fourth parameter h24636326765 is the reference to child vine list.

Among the codes, for example, h79547784277 (h24636326765,'2nd edition',[ ],none) is a terminal data vine. The first parameter h24636326765 is the reference to the parent data vine, the second parameter '2nd edition' is the tag value in the SGML data source, the third parameter [ ] is an empty list for properties, and the fourth parameter is none that indicates being a terminal vine and no more child reference.

The following is Prolog code for the data of three books under catalog in SGML.

```
j48310636322(v15375181413,'catalog',[ ],t39513293834).
  t39513293834(j48310636322,'book',[('cover',"papercover")],h24636326765).
    h24636326765(t39513293834,'title',[ ],u35112653426).
      u35112653426(h24636326765,'FOL and PROLOG',[ ],none).
    h24636326765(t39513293834,'edition',[ ],h79547784277).
      h79547784277(h24636326765,'2nd edition',[ ],none).
    h24636326765(t39513293834,'author',[ ],u11826728488).
```

-continued

```
     u11826728488(h24636326765,'last',[ ],a63364092259).
         a63364092259(u11826728488,'Ryder',[ ],none).
     u11826728488(h24636326765,'first',[ ],q79343971710).
         q79343971710(u11826728488,'Mike',[ ],none).
  h24636326765(t39513293834,'publisher',[ ],f71297706511).
     f71297706511(h24636326765,'AI Collections Inc.',[ ],none).
  h24636326765(t39513293834,'publishingDate',[ ],q99853395812).
     q99853395812(h24636326765,'April 26, 2002',[ ],none).
  h24636326765(t39513293834,'price',[('currency',"USD")],h17730132613).
     h17730132613(h24636326765,'14.99',[ ],none).
  h24636326765(t39513293834,'price',[('currency',"CAD")],w55896967414).
     w55896967414(h24636326765,'22.95',[ ],none).
  h24636326765(t39513293834,'price',[('currency',"GBP")],r40483995815).
     r40483995815(h24636326765,'10.99',[ ],none).
t39513293834(j48310636322,'book',[('year',""),('cover',"papercover")],
     y79664051616).
  y79664051616(t39513293834,'title',[ ],d92223856217).
     d92223856217(y79664051616,'Natural Language Processing with
         Prolog', [ ],none).
  y79664051616(t39513293834,'edition',[ ],v72043407518).
     v72043407518(y79664051616,'4th edition',[ ],none).
  y79664051616(t39513293834,'author',[ ],p35202283119).
     p35202283119(y79664051616,'last',[ ],g58931688220).
        g58931688220(p35202283119,'Anderson',[ ],none).
     p35202283119(y79664051616,'first',[ ],d34130928221).
        d34130928221(p35202283119,'Steve',[ ],none).
  y79664051616(t39513293834,'author',[ ],m35667072522).
     m35667072522(y79664051616,'last',[ ],s77176642523).
        s77176642523(m35667072522,'North',[ ],none).
     m35667072522(y79664051616,'first',[ ],b19587891124).
        b19587891124(m35667072522,'Hudson',[ ],none).
  y79664051616(t39513293834,'author',[ ],j65082617725).
     j65082617725(y79664051616;'last',[ ],m40716174626).
        m40716174626(j65082617725,'Turner',[ ],none).
     j65082617725(y79664051616;'first',[ ],d18414387727).
        d18414387727(j65082617725,'Martha',[ ],none).
  y79664051616(t39513293834,'publisher',[ ],e70566241128).
     e70566241128(y79664051616,'AI Collections Inc.', [ ],none).
  y79664051616(t39513293834,'publishingDate',[ ],g42930972529).
     g42930972529(y79664051616,'July 9, 2008',[ ],none).
  y79664051616(t39513293834,'price',[('currency',"USD")],h69078357330).
     h69078357330(y79664051616,'34.99',[ ],none).
  y79664051616(t39513293834,'price',[('currency',"CAD")],h53080996831).
     h53080996831(y79664051616,'37.99',[ ],none).
  y79664051616(t39513293834,'price',[('currency',"GBP")],s59677253732).
     s59677253732(y79664051616,'24.99',[ ], none).
t39513293834648310636322,'book',[('year',""),('cover',"papercover")],
     n63623716433).
  n63623716433(t39513293834,'title',[ ],c52455768634).
     c52455768634(n63623716433,'Manage Web Data with Prolog',
         [ ]none).
  n63623716433(t39513293834,'edition',[ ],b59375174135).
     b59375174135(n63623716433,'4th edition',[ ],none).
  n63623716433(t39513293834,'author',[ ],x85483396136).
     x85483396136(n63623716433,'last',[ ],g73079266837).
        g73079266837(x85483396136,'North',[ ],none).
     x85483396136(n63623716433;'first',[ ],q24239956438).
        q24239956438(x85483396136,'Hudson',[ ],none).
  n63623716433(t39513293834,'author',[ ],j21403832839).
     j21403832839(n63623716433,'last',[ ],b19174098340).
        b19174098340(j21403832839,'Anderson',[ ],none).
     j21403832839(n63623716433,'first',[ ],r1 9061767541).
        r19061767541(j21403832839,'Steve',[ ],none).
  n63623716433(t39513293834,'publisher',[ ],h91386946142).
     h91386946142(n63623716433,'AI Collections Inc.',[ ],none).
  n63623716433(t39513293834,'publishingDate',[ ],l91057065343).
     l91057065343(n63623716433,'October 25, 2003',[ ],none).
  n63623716433(t39513293834,'price',[('currency',"USD")],
     m16440723344).
     m16440723344(n63623716433,'39.99',[ ],none).
  n63623716433(t39513293834,'price',[('currency',"CAD")],
     e93056027745).
     e93056027745(n63623716433,'59.99',[ ],none).
  n63623716433(t39513293834,'price',[('currency',"GBP")],
     w46292234246).
w46292234246(n63623716433,'26.99',[ ],none).
```

A query "//catalog//title" will return the title information as result below.

```
<title>FOL and PROLOG</title>
<title>Natural Language Processing with Prolog</title>
<title>Manage Web Data with Prolog</title>
```

The query "//catalog//title" can be reused to build a knowledge lead in Prolog code as below.

```
shortcut(v15375181413,'lead1',[ ],[ h24636326765, y79664051616, n63623716433]).
This knowledge lead refers to the original data blow.
h24636326765(t39513293834,'title',[ ],u35112653426).
    u35112653426(h24636326765,'FOL and PROLOG',[ ],none).
y79664051616(t39513293834,'title',[ ],d92223856217).
    d92223856217(y79664051616,'Natural Language Processing with Prolog',[ ],none).
n63623716433(t39513293834,'title',[ ],c52455768634).
    c52455768634(n63623716433,'Manage Web Data with Prolog',[ ],none).
```

A new query "//lead1" will return the same title information with less processing time.

<title>FOL and PROLOG</title>
<title>Natural Language Processing with Prolog</title>
<title>Manage Web Data with Prolog</title>

Generally a frequently submitted query may be reused to build a knowledge lead that is a new hierarchical structure on the original data. Subsequent queries may take this advantage and navigate on the knowledge lead to get a short cut to the desired data. This feature helps a large-scale application.

The following contents are showing a query written with part 5. A query may contain SGML angle notations such as <example> and <book> in below. The query is submitted to server via part 3 of the query interface. In the query, the expression of title and edition in SGML angle notation are directly used without any quote symbol to extract corresponding data.

```
<example>
    //book!castnone(<mybook>title,edition</mybook>)
</example>
```

The result of this query is returned via part 4 of the query interface. Because the use of castnone operator the tags of <book></book> are not included in the result. Only title and edition are included because they are explicitly expressed in the query for extraction. The tags of <mybook>, </mybook> in the query are used to enclose title and edition in the result.

```
<example>
    <mybook>
        <title>
        FOL and PROLOG
        </title>
        <edition>
        2nd edition
        </edition>
    </mybook>
    <mybook>
        <title>
        Natural Language Processing with Prolog
        </title>
        <edition>
        4th edition
        </edition>
    </mybook>
```

```
    <mybook>
        <title>
        Manage Web Data with Prolog
        </title>
        <edition>
        4th edition
        </edition>
    </mybook>
</example>
```

The query language in the invention suggests a data object called data vine and a data structure type called data vine list. Data vine list is an ordered list of data vines. Data vine and data vine list are logic views to write a query. A data vine is a piece of data with a name that is a string of letters, a property list that is a set of pairs, and a vine list as its children. Constant data of a number, a string, a single quote, and a double quote are classified as terminal data vine. A terminal data vine has a constant as its name, an empty proper list, and a null child list. The following content corresponds to a data vine with a name of "book", a property list of [(cover, "papercover")], and a child list that has 3 data vines as members: "title", "edition", and "author". Among the child list the first member is the data vine with the name "title", an empty property list, and a child list of the only member "FOL and PROLOG". In turn, the constant "FOL and PROLOG" is a terminal data vine with the name of itself, an empty proper list, and a null child list. The same logic views can apply on the second member of data vine "edition" and the third member of data vine "author".

```
<book cover="papercover">
    <title>FOL and PROLOG</title>
    <edition>2nd edition</edition>
    <author><last>Ryder</last><first>Mike</first></author>
</book>
```

The child operator "/" and the descendent operator "//" are extended to accept a data vine list and return a data vine list. For example, "catalog" is data vine list. The expression "catalog/book" represent another data vine list that all of its members are immediate children of "catalog". The expression "catalog//last" is a data vine list that all of its members are descendent of "catalog" and each with the vine name "last". A variable in the query language is used to represent a data vine list. A variable is prefixed with an underscore symbol. The query language uses symbol of ":=" to assign a data vine list to a variable. For example, _book is a variable and //book is a data vine list, the assignment is _book:=//book.

The operator castnone is designed to provide a chance for prototyping a data element. The data in FIG. 2 are input to the server. In FIG. 3 a query similar to the following query is submitted. The variable _Book is assigned to a data vine list to hold the elements of "book". Then the castNone operator acts on this list. There are four statements as the parameters of castNone, "<book>", "title", "edition", and "</book>". The two statements "title" and "edition" are the original tag names in the given data set. The castnone operator iterates on the act-on data vine list but does not extract anything. These two statements explicitly extract elements of <title> and <edition> from the act-on data vine list and cast them out in the result.

```
_Book:=//book,
<example1>
    _Book!castNone(<book>title,edition,</book>)
</example1>
```

As in FIG. 3 there are nine book elements in the result. The first book and the second book have the same title with different editions. The angle tags of <book> are not from extracting but from the query declaration.

The operator castall is designed to extract a piece of data with hierarchical infrastructure intact. The data in FIG. 2 are input to the server. In FIG. 4 the castAll operator casts all out including <book> tag with its attributes. There are three statements as the parameters. The statement noshow( ) is used to block casting out anyone under the element <book>, but it does not block the casting of the tag <book>. After blocking all elements under the <book> element, the statements "title" and "edition" are used to explicitly extract elements of <title> and <edition> from the act-on data vine list and cast them out in the result.

```
_Book:=//book,
<example2>
    _Book!castAll(
        noshow(),
        title,
        edition,
    )
</example2>
```

As in FIG. 4 there are nine book elements in the result. The castall operator extracts the angle tags of <book> with the attribute in tags. The contents in the angle tags of <book> are also extracted but suppressed by the noshow( ) statement.

The operator restrict is designed to screen out members from the act-on data vine list. The data in FIG. 2 are input to the server. In FIG. 5, //book is a data vine list with 9 book elements. The query "//book!restrict(1,3,4,7)" only keeps the elements of index 1,3,4, and 7 that includes the result data vine list. Other legal expressions in a restrict operator could be following:

```
//book!restrict(between 2 and 8), with a parameter expressed as between X
and Y to get the middle part from item X to item Y;
    //book!restrict(first 5), with a parameter expressed as first N to get the first part of N items;
    //book!restrict(last 3), with a parameter expressed as last N to get the last part of N items;
    //book!restrict(even), with a parameter expressed as even to get items in even indexes;
    //book!restrict(odd), with a parameter expressed as odd to get items in odd indexes.
```

The unique operator is designed to make a given data vine list to be unique up to the given condition in parameters. It acts on the given data vine list and only selects the first item if multiple items satisfy the condition. A single data vine name or a tag name in the parameter is used for operation. No path operator "/" is needed in the parameter. In FIG. 6, the query //book/author is the operant of the unique operator and is a data vine list of 13 members including all <author> elements in FIG. 2. The query is "//book/author!unique(last)" which means make it unique up to the last name of the <last> element in FIG. 2. After operation of unique operator on the data vine list of 13 members, 9 members with different last names are extracted and remained on the result list.

The sort operator is designed to sort a given data vine list up to conditions in parameters. The operant of sort operator in FIG. 7 is the result vine list from FIG. 6, which is "//book/author!unique(last)". The query is "//book/author!unique(last)!sort(//last)". It sorts the data vine list up to the last names of <last> elements. In case a sorting flag is omitted and the default value of 1 is used for the sorting order of sensitive ascending. The sort operator has more options. The first parameter sortFlag is a sorting flag. Its value can be 1 for sensitive ascending, 2 for sensitive descending, 3 for insensitive ascending, and 4 for insensitive descending. The flag could be omitted and the default value 1 for sensitive ascending is used. The second parameter, with a notation of tagName as a data vine name or as a tag name and attributeName as a property or as an attribute name, can be written as expressions of tagName, /tagName, //tagName, tagName@attributeName, /tagName@attributeName, //tagName@attributeName, and @attributeName. The following are legal use of the sort operator although some of them may not cause significant sorting change:

```
//book!sort(//book@cover);
//book!sort(3,//last);
//book!sort(2//title);
//author!unique(//last)!sort(//first).
```

Figure 8:
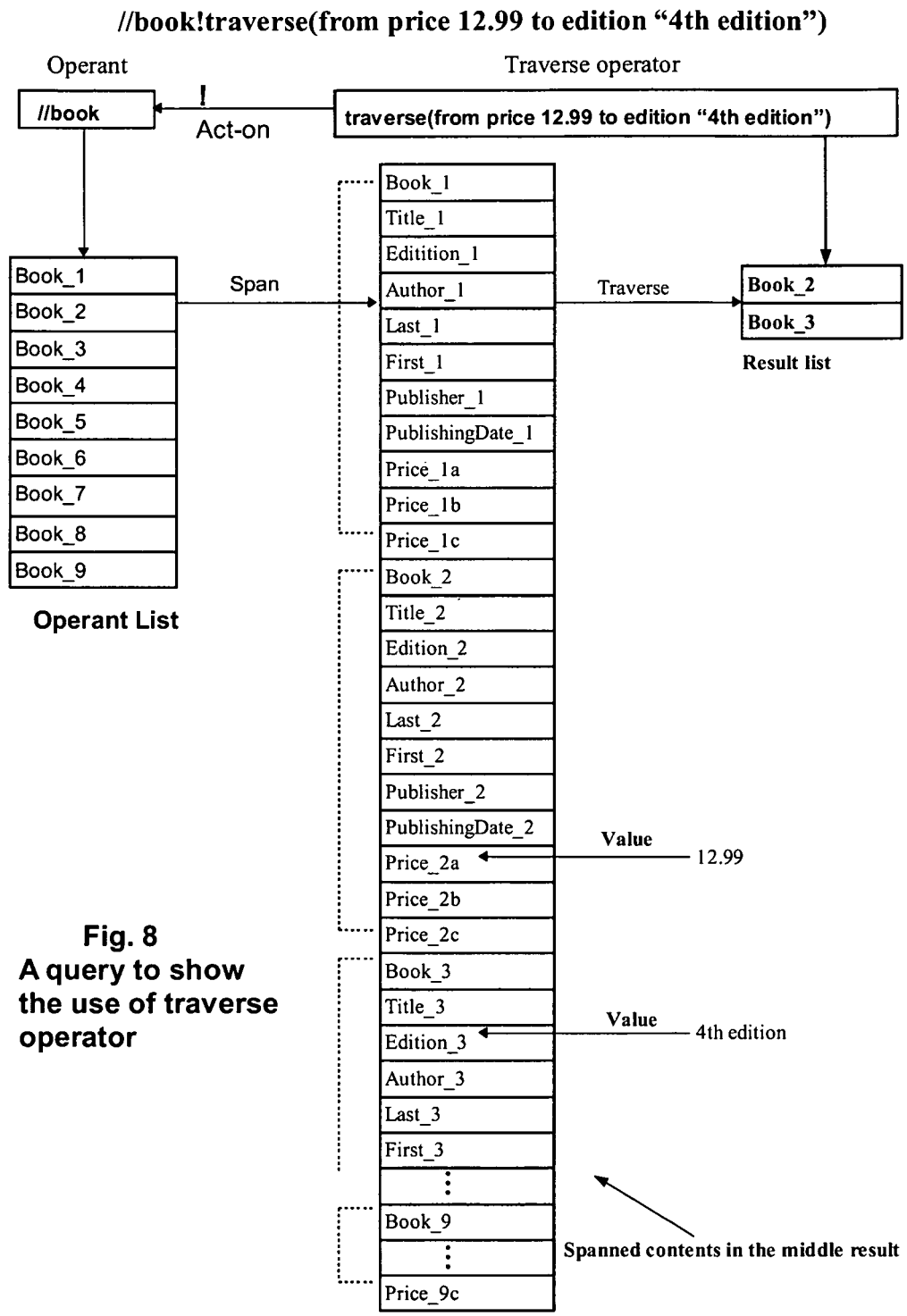
FIG. 8 illustrates a query to show the use of a traverse operator.

The operator traverse is designed to help a user for data mining on a specific part in databases with one or two values under a tag name or a data vine name. A traverse operator acts on a data vine list that is a hierarchical structure as a tree. The traverse operator picks items in the tree on a backward traverse path according to the given condition in the parameter, extracts and collects any member from the operant list if the member has a descendent in the picked up list. In FIG. 8, a traverse operator acts on a data vine list of nine <book> elements. The parameter is expressed as, from price 12.99 to edition "4th edition". All descendent elements of these nine <book> elements are put into the middle result list in the order of their appearances in FIG. 2. The traverse operator picks elements Price_2a, Price_2b, Price_2c, Book_3, Title_3, and Edition_3 due to the value 12.99 is in Price_2a and the value "4th edition" is in Edition_3, and, locates the ancestors of these picked elements in the operant list, which are Book_2 and Book_3 in the result list. A traverse operator and its parameter could be one of the following. In the notation here, tagName1 and tagName2 represent tag names, and, aValue1 and aValue2 represent values.

!traverse (from tagName1 aValue1 to tagName2 aValue2);
!traverse (from tagName1 aValue1);
!traverse (to tagName2 aValue2).

A property list is a logic view of attributes. In FIG. 2, the <book> elements have one or two attributes. In the first starting <book>tag as of <book cover="papercover">, the corresponding property list is [("cover", "papercover")]. In the third starting <book> tag as of <book year=" " cover="papercover">, the corresponding property list is [("year", " "), ("cover", "papercover")].

The default operation provides a replacement for the entire property list. The query, //book!castall([("tagTitle",title), ("searchDate",datenow( ))]), provides replacements for attributes of all <book> tags in FIG. 2 with [("tagTitle",title), ("searchdate",datenow( ))]), by which the first <book>tag becomes <book tagTitle="FOL and PROLOG" searchDate="20111224"> and the third <book> tag becomes <book tagTitle="Natural Language Processing with Prolog" searchDate="20111224">.

The update operation updates the existing property list. The query, //book!castall(+[("year",publishingdate), ("searchDate",datenow( ))]), updates the attribute values of the attribute name "year", and adds the new attribute of name searchDate. The first <book>tag becomes <book cover="papercover" year="Apr. 26, 2002" search- Date="20111224"> and the third <book> tag becomes <book year="Jul. 9, 2008" cover="papercover" searchDate="20111224">.

The elimination operation removes the designated members from the existing property list. The query, //book!castall (-[("year", " ")]), removes the attribute of the name "year". The first <book>tag becomes <book cover="papercover"> and the third <book> tag becomes <book cover="papercover">.

The replacement operation renews the property value only for a property that has the same property name in both property lists of the operation. The query, //book!castall(* [("year",publishingdate),("searchDate",datenow( ))]), renews the proper values of the property name "year" only. The first <book>tag becomes <book cover="papercover"> and the third <book> tag becomes <book year="Jul. 9, 2008" cover="papercover">.

The intersection operation verifies the existing property list so that a property is kept if it has the same property name in both property lists of the operation. The query, //book!castall (^[("year", " ")]), intersects each of property lists of <book> elements with [("year", " ")]. The first <book>tag becomes <book> since it does not have attribute of the name "year" and the third <book> tag becomes <book year=" ">.

The query language in the invention provides aggregation functions on a data vine list:

The sum function gets the summation number of all data vine values from a data vine list.

The count function gets the count number of a data vine list.

The avg function gets the average number of all data vine values from a data vine list.

The min function gets the minimum number of all data vine values from a data vine list.

The max function gets the maximum number of all data vine values from a data vine list.

The median function returns a list of data vines that are located in the middle of a data vine list.

The query language in the invention provides criterion functions that return a value of true if the criterion is satisfied otherwise it returns false.

The equal function is expressed as the equal sign "=", the left side of "=" is a data vine list A and the right side of "=" is evaluated to a number or a double quote B. The function returns true if all data vines in A evaluate to the value of B.

The greater-than function is expressed as the word "isGT"; the left side of "isGT" is a data vine list A and the right side of "isGT" is evaluated to a number or a double quote B. The function returns true if one data vine in A has the value greater than B.

The greater-than-or-equal function is expressed as the word "isGTE"; the left side of "isGTE" is a data vine list A and the right side of "isGTE" is evaluated to a number or a double quote B. The function returns true if one data vine in A has the value greater than or equal to B.

The less-than function is expressed as the word "isLT"; the left side of "isLT" is a data vine list A and the right side of "isLT" is evaluated to a number or a double quote B. The function returns true if one data vine in A has the value less than B.

The less-than-or-equal function is expressed as the word "isLTE", the left side of "isLTE" is a data vine list A and the right side of "isLTE" is evaluated to a number or a double quote B. The function returns true if one data vine in A has the value less than or equal to B.

The query language in the invention provides conditional statements if-then and if-then-else that accommodate data vine lists.

In the statement if title="PROLOG Quick Guide" then <promotecode> 12345 </promotecode> the left side of the equal sign is the tag name title, represents a data vine list; and the right side of the equal sign is a double quote. Only the sixth <book> element in FIG. 2 gets satisfied with this criterion at the according navigation and iteration position where the than-part of <promotecode> 12345 </promotecode> gets added to the result.

In the query of FIG. 10

```
<bib>
    //book!castNone(
    count(author) isGT 1,
        title,
        author! restrict(1,2),
        if count(author) isGT 2 then <etcetra/>
    )
</bib>
``` the statement, count(author) isGT 1, allow further execution only on those <book> elements that have two or more authors of the book;

the statement, title, casts out an element of <title>;

the statement, author! restrict(1,2), casts only the first and second of <author> elements;

the statement, if count(auth) isGT 2 then <etcetra/>, casts out a single tag <etcetra/> for a book with three or more authors.

A data vine list represented by a tag name, a path, or a data vine name is a legal statement.

A path operation of the child operator of one slash and the descendent operator of two slashes is a legal statement An operation of the Cast, Restrict, Unique, Sort, and Traverse operators is a legal statement.

A property operation is a legal statement.

A beginning angle tag and its closing angle tag conforming well-formed rules is a legal statement. The angle tags appear pair and must obey the well-formed rules. The comma following an angle tag can be omitted.

A single angle tag is a legal statement. The comma following an angle tag can be omitted.

An assignment operation is a legal statement.

An assigned variable is a legal statement.

A defined function is a legal statement.

A built-in statement is a legal statement.

A conditional statement is a legal statement.

SGML tags, tag names, and attribute names in hierarchical databases are embedded in the query language for direct use as legal terms in a query. A tag element is assigned to a logic view of a data vine. A tag name is assigned to a logic view of a data vine list. The attribute name is assigned to a logic view of a property name. In the query of FIG. 11, the starting tag <averageprice> and the ending tag </averageprice> with contents in between consolidate an hierarchical element that is assigned to a logic view of data vine; price is a tag name in FIG. 2 and is assigned to represent a data vine list, in which every member has the tag name of price; currency is an attribute name in FIG. 2 and is assigned to be used as a property name.

In the query of FIG. 11,

```
_Book:=//book,
<example>
    _X:=_Book//price!castAll(@currency="USD"),
```

```
    <averageprice>,
       "The total amount is $",sum(_X),'. The average price of ",
       count(_X),"books is $",avg(_X),".",
    </averageprice>,
 </example>
``` the statement, _Book:=//book, assigns the variable _Book to a data vine list that holds <book> elements;

the starting tag and ending tag of <example> are used without any quote signs, and a comma followed angle tag <example> is omitted;

the statement, _X:=_Book//price!castAll (@currency="USD"), assigns to the variable_X the result list that holds all <price> elements with the attribute currency="USD";

the statement, "The total amount is $", is a double quote and is to be directly included in the result;

the statement, sum(_X), is a aggregation function that returns the total US dollars contained in the <price> elements in the FIG. 2;

the statement,". The average price of", is a double quote and is to be directly included in the result;

the statement, count(_X), is a aggregation function that returns the total count of books in FIG. 2;

the statement, "books is $", is a double quote and is to be directly included in the result; and the statement, avg(_X), is a aggregation function that returns the average price in US dollars of all books in FIG. 2.

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

I claim:

1. A non-transitory computer-readable recording medium that stores therein a computer program that causes a computer to read pieces of data that are distributed in databases that accept program codes that cause the computer to execute and return a query result as data that are identified in hierarchical structures, the program codes comprising:

first computer readable program code defining a query including statements where two consecutive statements are separated by a comma and each statement has a data part followed by a series of operators that the first operator acts on the data part and yields a data result for the next operator to act on, and so on each operator yields a data result for the next operator to act on, and the series of operators causes the computer with act-on operations in the order according to the operators appearing in the series from left to right;

second computer readable program code defining a data term that has a name, a property list that is of a fifth computer readable program code, and a child list that is of a third computer readable program code;

the third computer readable program code defining a structure type that is an ordered list of items of the second computer readable program code;

fourth computer readable program code defining an operator that has parameters of a data type of the second or third computer readable program code, which references a piece of data of the third computer readable program code and causes the computer to execute on its parameters;

the fifth computer readable program code defining a property list that is a group of pairs with a first data element in a pair identified as a property name and a second data element in the pair identified as a property value, which allows set union, intersection operations with another property list yielding a new property list as an operation result;

sixth computer readable program code defining a variable that is identified as a character string prefixed with an underscore, which represents a piece of data in a type of third computer readable program code; and seventh computer readable program code causing the computer to execute and return a query result as data that are identified in hierarchical structures.

2. The computer readable medium according to claim 1, wherein the fourth computer readable program code is identified as a cast operator with parameters of the second or third computer readable program code, which references a piece of data of the third computer readable program code, thereafter causes the computer to execute on its parameters, and thereafter elements in the referenced data are copied or updated to form a result of the third computer readable program code.

3. The computer readable medium according to claim 1, wherein the fourth computer readable program code is identified as a restrict operator with parameters of the second or third computer readable program code, which references a piece of data of the third computer readable program code, thereafter causes the computer to execute on its parameters, and thereafter elements in the referenced data are checked and only a part of the referenced data remains as a result of the third computer readable program code.

4. The computer readable medium according to claim 1, wherein the fourth computer readable program code is identified as a unique operator with parameters of the second or third computer readable program code, which references a piece of data of the third computer readable program code, thereafter causes the computer to execute on its parameters, and thereafter elements in the referenced data are checked for duplication and only the non-duplicated part of the referenced data remains as a result of the third computer readable program code.

5. The computer readable medium according to claim 1, wherein the fourth computer readable program code is identified as a sort operator with parameters of the second or third computer readable program code, which references a piece of data of the third computer readable program code, thereafter causes the computer to execute on its parameters, and thereafter elements in the referenced data are sorted into a result of the third computer readable program code.

6. The computer readable medium according to claim 1, wherein the fourth computer readable program code is identified as a traverse operator with one parameter of the format of words "from" and "to" with the second computer readable program code, which references a piece of data of the third computer readable program code, thereafter causes the computer to execute on its parameters, and thereafter the referenced data are expanded from hierarchical structures to a flat structure that is traversed with its members being checked for constructing a result of the third computer readable program code.

7. The computer readable medium according to claim 1, wherein a symbol of a colon followed by equal sign, ":=", is recognized after a variable of the sixth computer readable program code, which assigns the third computer readable program code to the variable.

8. The computer readable medium according to claim 1, wherein no sign exists before a property list of the fifth computer readable program code and is identified as a default operation that returns the property list as a result.

9. The computer readable medium according to claim 1, wherein a plus sign is recognized before a property list of the fifth computer readable program code and is identified as an update operation that references an existing property list and returns a result constructed by joining the property list, which follows an operation symbol, into the referenced property list, and overwriting anyone in the referenced property list in case a property name is found to be the same in both lists.

10. The computer readable medium according to claim 1, wherein a minus sign is recognized before a property list of the fifth computer readable program code and is identified as an elimination operation that references an existing property list and returns a result property list that starts from the referenced property list and excludes any member inside if the member is also found in the property list that follows an operation symbol.

11. The computer readable medium according to claim 1, wherein a star sign is recognized before a property list of the fifth computer readable program code and is identified as a replacement operation that references an existing property list and returns a result property list constructed by having the referenced property list and replacing anything inside with one of a same property name in the referenced list and the property list that follows an operation symbol.

12. The computer readable medium according to claim 1, wherein a caret sign is recognized before a property list of the fifth computer readable program code and is identified as an intersection operation that references an existing property list and returns a result property list that is a common part of the referenced property list and a list that follows an operation symbol.

13. The computer readable medium according to claim 1,
wherein criterion functions, equal, greater-than, greater-than-equal, less-than, and less-than-equal are implemented on the second and the third computer readable program code, and
wherein aggregation functions, sum, count, average, minimum, maximum, and median are implemented on the second and the third computer readable program codes.

14. The computer readable medium according to claim 1, wherein the fourth computer readable program code is identified as a cast operator with parameters of the second or third computer readable program code, which references a piece of data of the third computer readable program code, thereafter causes the computer to execute on its parameters, and thereafter elements in the referenced data are copied or updated to form a result of the third computer readable program code, and wherein noshow( ) of the first computer readable program code counteracts with a castall operator by blocking casts of the second and the third computer readable program code.

15. The computer readable medium according to claim 1, wherein the fourth computer readable program code is identified as a cast operator with parameters of the second or third computer readable program code, which references a piece of data of the third computer readable program code, thereafter causes computer to execute on its parameters, and thereafter elements in the referenced data are copied or updated to form a result of the third computer readable program code, and wherein showall( ) of the first computer readable program code counteracts with a castnone operator by casting out the second and the third computer readable program code.

16. The computer readable medium according to claim 1, wherein standin(_Var) of the first computer readable program code gets a current navigating data vine list and assigns it to variable _Var of the sixth computer readable code.

17. The computer readable medium according to claim 1, wherein the first computer readable program code includes logic and criterion functions, logic if-then is implemented with if-part of the criterion functions and the then-part of the first computer readable program code, logic if-then-else is implemented with if-part of the criterion functions then-part of first computer readable program code, and else-part of first computer readable program code, and wherein the criterion functions, equal, greater-than, greater-than-equal, less-than, and less-than-equal are implemented on the second and the third computer readable program code.

18. The computer readable medium according to claim 1, wherein the first computer readable program code accepts layer delimiters in hierarchical databases as a native part of the first computer readable program code, which includes tags, tag names, and attribute names in hierarchical databases, wherein a tag element in a hierarchical database is binding on a logic view of the second computer readable program code, a tag name in a hierarchical database is binding on a logic view of the third computer readable program, and an attribute name in a hierarchical database is binding on a logic view of a property name in the fifth computer readable program code, and
wherein middle results of processing the first computer readable program code are stored as the second computer readable program code for use on a subsequent part of the first computer readable program code.

19. A computer-implemented method for facilitating the execution of a set of instructions on a computer having a processor and a memory, that causes the computer to read pieces of data that are distributed in databases that accept program codes that cause the computer to execute and return a query result as data that are identified in hierarchical structures, the method comprising:
providing first computer readable program code defining a query including statements where two consecutive statements are separated by a comma and each statement has a data part followed by a series of operators that the first operator acts on the data part and yields a data result for the next operator to act on, and so on each operator yields a data result for the next operator to act on, and the series of operators causes the computer with act-on operations in the order according to the operators appearing in the series from left to right;
providing second computer readable program code defining a data term that has a name, a property list that is of a fifth computer readable program code, and a child list that is of a third computer readable program code;
providing the third computer readable program code defining a structure type that is an ordered list of items of the second computer readable program code;
providing fourth computer readable program code defining an operator that has parameters of a data type of the second or third computer readable program code, which references a piece of data of the third computer readable program code and causes the computer to execute on its parameters;
providing the fifth computer readable program code defining a property list that is a group of pairs with a first data element in a pair identified as a property name and a second data element in the pair identified as a property value, which allows set union, intersection operations with another property list yielding a new property list as an operation result;
providing sixth computer readable program code defining a variable that is identified as a character string prefixed with an underscore, which represents a piece of data in a type of the third computer readable program code; and providing seventh computer readable program code causing the computer to execute and return a query result as data that are identified in hierarchical structures.

20. A hierarchical data server comprising:

a memory for storing data and a computer program that causes the data server to read pieces of data that are distributed in databases that accept program codes that cause the data server to execute and return a query result as data that are identified in hierarchical structures;

a processor coupled to the memory for executing the computer program, the computer program comprising:

first computer readable program code defining a query including statements where two consecutive statements are separated by a comma and each statement has a data part followed by a series of operators that the first operator acts on the data part and yields a data result for the next operator to act on, and so on each operator yields a data result for the next operator to act on, and the series of operators causes the data server with act-on operations in the order according to the operators appearing in the series from left to right;

second computer readable program code defining a data term that has a name, a property list that is of a fifth computer readable program code, and a child list that is of a third computer readable program code;

the third computer readable program code defining a structure type that is an ordered list of items of the second computer readable program code;

fourth computer readable program code defining an operator that has parameters of a data type of the second or third computer readable program code, which references a piece of data of the third computer readable program code and causes the data server to execute on its parameters;

the fifth computer readable program code defining a property list that is a group of pairs with a first data element in a pair identified as a property name and a second data element in the pair identified as a property value, which allows set union, intersection operations with another property list yielding a new property list as an operation result;

sixth computer readable program code defining a variable that is identified as a character string prefixed with an underscore, which represents a piece of data in a type of the third computer readable program code; and seventh computer readable program code causing the data server to execute and return a query result as data that are identified in hierarchical structures.

\* \* \* \* \*